W. A. STEVENSON.
METHOD OF CLEANING FILTER BEDS.
APPLICATION FILED MAR. 13, 1911.
1,069,737.
Patented Aug. 12, 1913.
2 SHEETS—SHEET 1.
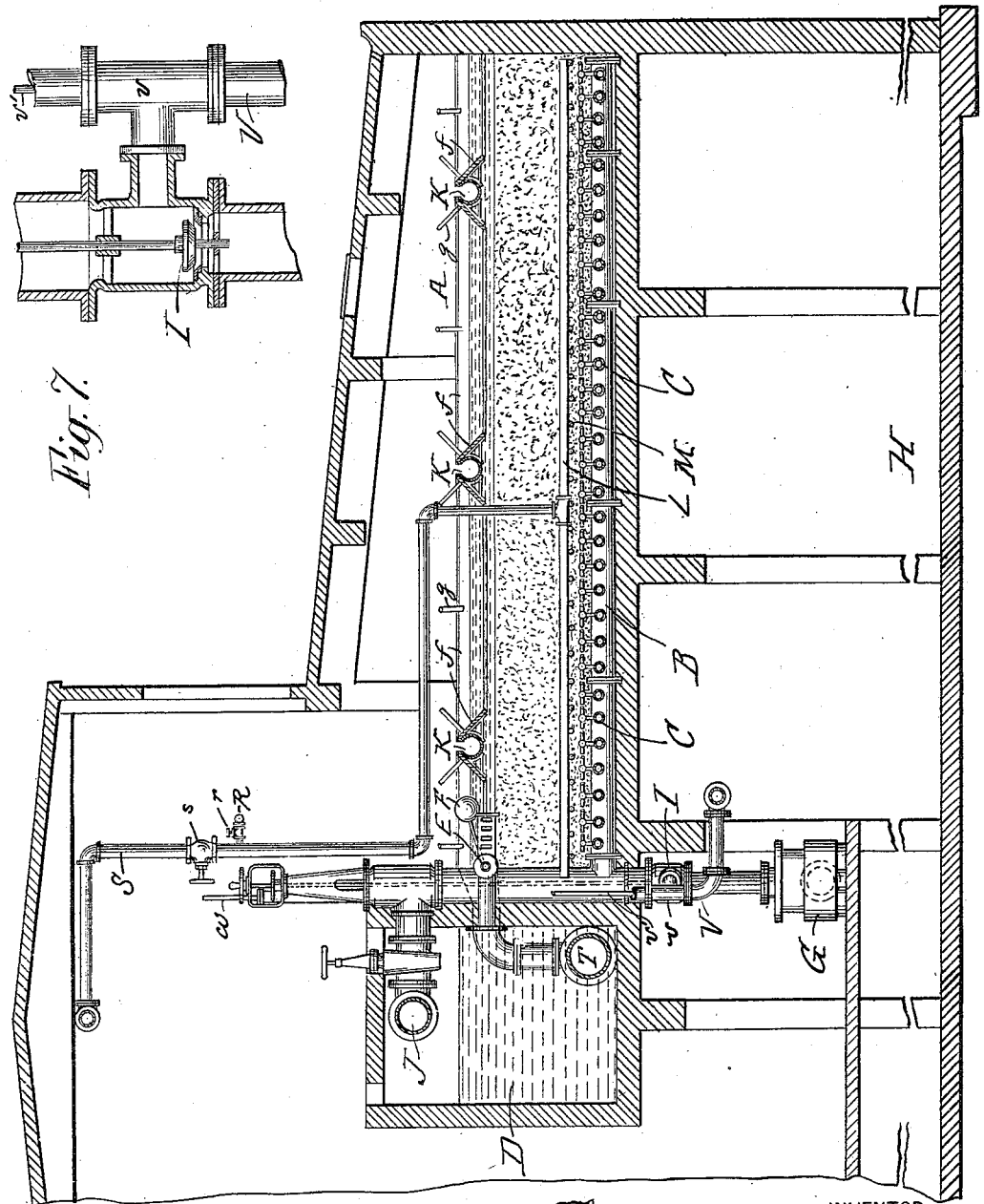
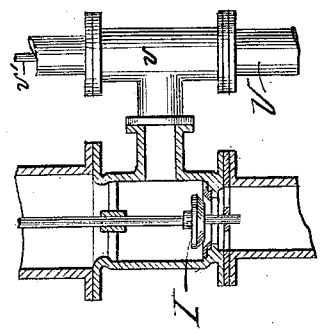
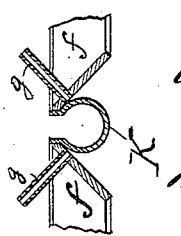
WITNESSES:
INVENTOR:
William A. Stevenson,
BY
ATTORNEYS.

W. A. STEVENSON.
METHOD OF CLEANING FILTER BEDS.
APPLICATION FILED MAR. 13, 1911.
1,069,737.
Patented Aug. 12, 1913.
2 SHEETS—SHEET 2.
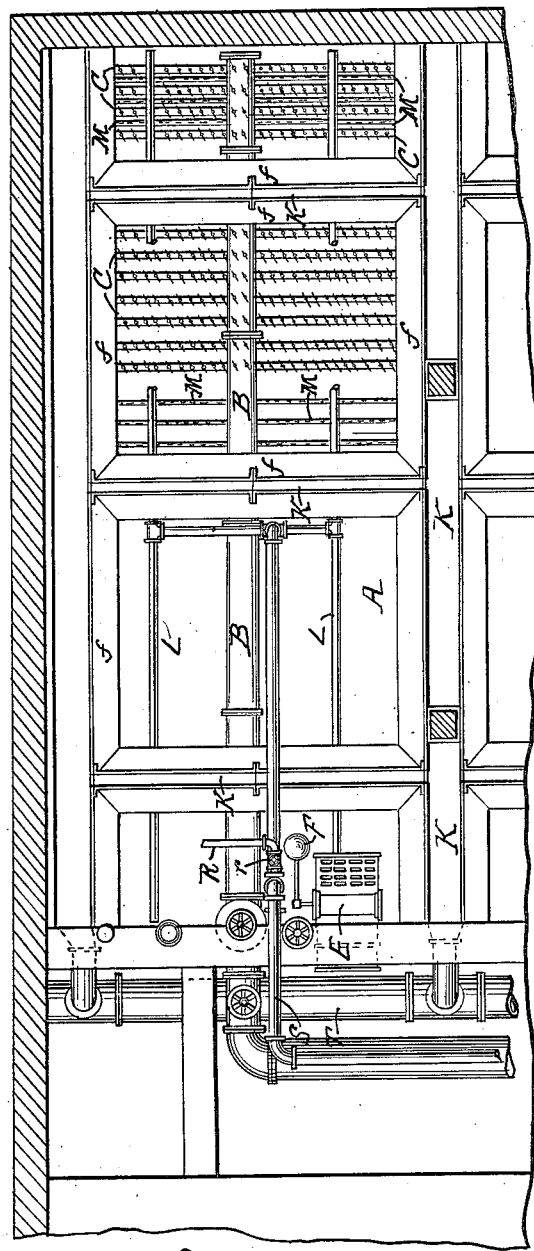
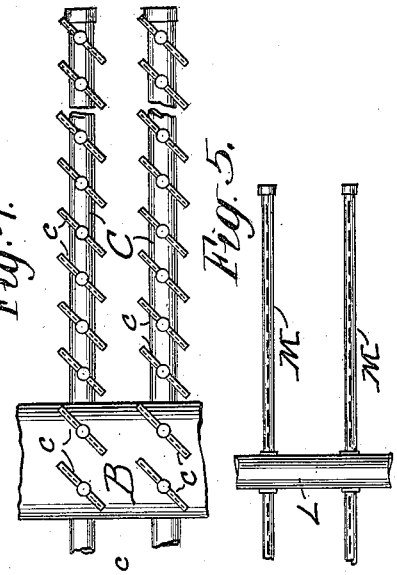
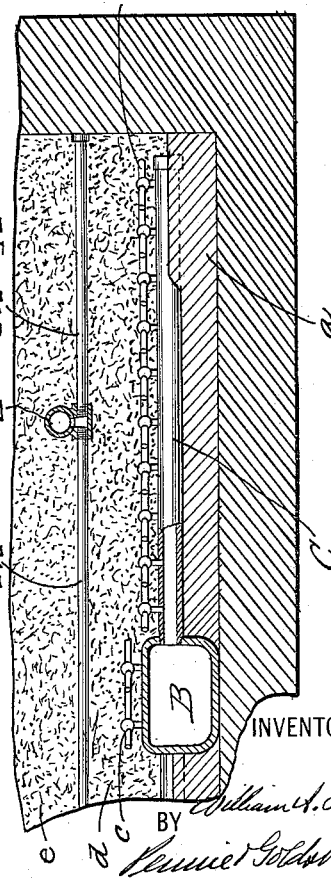

UNITED STATES PATENT OFFICE.

WILLIAM A. STEVENSON, OF FLORENCE, MASSACHUSETTS.

METHOD OF CLEANING FILTER-BEDS.

1,069,737. Specification of Letters Patent. Patented Aug. 12, 1913.

Application filed March 13, 1911. Serial No. 614,074.

*To all whom it may concern:*

Be it known that I, WILLIAM A. STEVENSON, a citizen of the United States, residing at Florence, in the county of Hampshire, State of Massachusetts, have invented certain new and useful Improvements in Methods of Cleaning Filter-Beds; and I do hereby declare the following to be a full, clear, and exact description of the invention, such as will enable others skilled in the art to which it appertains to make and use the same.

My invention relates to certain new and useful improvements in filtering, and is applicable to the operation of filtering apparatus of the general type shown, for instance, in United States Letters Patent No. 798,473, granted Aug. 29, 1905, to William W. Wilson, wherein is shown a bed of filtering material, within which is located a branched collector conduit, for taking off the filtered water and for obtaining a reverse flow of wash water during the operation of cleaning the filter bed, and air pipes for introducing currents of air through the filter bed to coöperate with the wash water in opening up or loosening the filtering material and agitating it during the washing operation.

In the accompanying drawings, I have illustrated a filtering apparatus of this general type, adapted for the practice of my invention.

In said drawings, Figure 1 represents, partly in section and partly in elevation, a view of a single unit or filter with the necessary adjuncts for the practice of the invention. Fig. 2 represents a plan view thereof. Fig. 3 represents an elevation and partial section transverse to the view shown in Fig. 1; and Fig. 4 represents, on a larger scale, a top plan view of a portion of the main collector pipe of the filter, and its branches. Fig. 5 represents, also on a larger scale, a top plan view of a portion of the pipe for introducing air currents into the filter bed, and its branches. Fig. 6 represents, also on a larger scale, a cross-sectional view of one of the waste wash-water channels, its sideboards and air-releasing tubes; and Fig. 7 represents, also on a larger scale, partly in section and partly in elevation, a portion of the conduit leading to the rate-controller, and an adjacent portion of the conduit leading to the sewer.

Similar letters of reference indicate similar parts throughout the several views.

Referring to the drawings, A indicates the filtering basin or receptacle, within which, upon suitable grouting, $a$, is located the collector conduit for the filtered water, consisting preferably of a main collector pipe B having branches C transverse thereto, said collector pipe B and the branches C being further provided with a series of collector tubes $c$, suitably slitted, as is common in this type of filtering apparatus. These collector tubes are protected by a layer of gravel $d$, above which the layer of sand $e$ extends, the top of the sand bed being usually about twelve inches below the water level.

The water to be filtered may be admitted into the basin A in any convenient manner, but is preferably supplied from the channel D through a spreader valve E, governed by a float F, so that the required height of water on the filter bed may be maintained uniform during the filtering operation. The collector pipe communicates with a rate controller G having discharge ports adjusted to establish the desired rate of flow and which discharge into the clear well H, which may conveniently be located below the filter basin. A valve and valve housing I interposed in the connection to the rate controller permits the flow of water thereto to be entirely interrupted whenever it is desired to wash the filter bed, which will occur daily or oftener, according to circumstances.

In order to supply filtered water for the washing of the filter bed and particularly to remove the thin layer of slime or sediment which may collect upon the upper surface of the sand, a conduit J is provided having a cutoff valve and connected to the collector pipe B and to its branches; so that, by closing the valve I in the down-take to the rate controller and opening the valve in the conduit J filtered water will be forced out into all of the branches of the collector pipe and through the strainers attached to the collector pipe and its branches, and this water passing up through the sand, will overflow into the waste wash water channels K which are provided with the usual sand intercepting side boards $f$ having the air releasing tubes $g$, of the type and for the purposes shown in the aforesaid Wilson patent. This upward flow of the wash water loosens up the filtering material, and, as the water rises in the bed the float F actuates the float valve E, thereby shutting off the supply of the unfiltered water to the basin. The rising water, carrying with it the fine sediment that has been deposited in and upon the sand layer overflows into the wash overflow channels K from which it is conducted to the sewer, or other point of waste discharge.

In connection with the supply of wash water to the filter bed air under pressure is admitted through the main S and its branches L and the laterals M communicating with the said branches. These laterals are provided with a large number of fine slots or small round holes to permit the air to discharge through the entire area of the bed. In issuing from these slots or holes the air expands somewhat, thereby making the agitation correspondingly more energetic, and greatly increasing the efficiency of the washing process.

It will be understood that, during filtration, inasmuch as the filtered water discharges through the rate controller at a point below the sand bed, the suction caused by this negative head tends to produce a vacuum in the slitted air pipes, so that, unless some compensating provision is made, the closing of the valve I, preparatory to opening the valve admitting the supply of filtered wash water from the conduit J, would be accompanied by an inrush of water from the bed of said into the system of air pipes before the filtered wash supply could reach the filter bed. Such an inrush of water into the air pipes would carry in with it more or less fine sand from the filter bed, occasioning serious obstructions in the pipes. To avoid this difficulty, I provide for filling the air pipe system with water from a water pressure main as R provided with a suitable cut off valve $r$, which is opened to admit water to fill the air pipe system L and its laterals M immediately before the valve in the branch leading to the rate controller is closed, so that the air pipes L and their branches M being already occupied with water will suppress any inflow from the filter bed. As soon as the supply of wash water reaches the filter bed and begins its upward flow therethrough, the valve $r$ is closed, thereby interrupting the flow of water into the air pipes from the water supply main R, and a valve $s$ is opened leading from the air pressure main S, thereby driving the water out of the air pipe L and its branches M and admitting into the filter bed a corresponding number of jets of air through the slitted openings of said pipe and its branches, which air, in conjunction with the wash water, opens up and loosens the filtering material, and the wash water passes over into overflow channels K, as above described, carrying with it the sediment and like impurities, until the cleansing operation is finished. At this stage of the operation, it is desirable to stop the inflow of the compressed air into the filter bed before opening the valve leading to the rate controller, and before closing the valve which admits the wash water. Unless this is done, the reëstablishment of the suction by the closing of the wash water valve and the opening of the valve leading to the rate controller would cause air to be drawn into the collector pipe B and its branches C, and experience has shown that this indrawing of air seriously interferes with the subsequent filtration, for reasons which are somewhat obscure but probably because the air thus drawn in is in some way pocketed in the system, thereby cutting down the effective suction-producing action of the negative head. However this may be, it is found that any such difficulty disappears when, as above indicated, the cock $s$ in the air pressure main S is closed before the valve in the branch leading to the rate controller is opened and before the valve in the conduit J admitting the wash water is closed. As soon as the valve $s$ is closed, the valve $r$ in the water supply main R is opened and the filtered water from the supply main R drives out the air from the air pipe L and its branches M, said air rising with the wash water and making its exit from the filter. The valve in the wash water conduit J may then be closed and the valve I in the branch leading to the rate controller may be opened to reëstablish filtration, whereupon the pipe $r$ in the water supply main is again closed.

In some instances, it will be preferable, upon reëstablishing the filtration, to divert into the sewer that portion of the water which is first received into the collector pipe B at the termination of the washing operation, instead of sending it through the rate controller into the clear well. To effect this purpose, I provide a branch V leading to the sewer, and having a valve housing section $v$ in which is located a valve adapted to be operated by the valve stem $v'$; so that, in starting the filtration after the washing operation has terminated, I may thus, instead of opening the valve I leading to the rate controller, open the valve in the valve housing $v$, whereupon the water thus first entering the collector pipe B after filtration has been reëstablished, will pass to the sewer. This water is the last portion of the water which has been employed for washing the filter bed and is liable to contain more or less impurities which are thus disposed of without entering the clear well. As soon as this portion of the water has passed on to the sewer the valve in the valve housing *v* may be again closed and the valve I leading to the rate controller opened. To vary the flow through the rate controller, its outlet valve (not shown in the drawings) may be actuated by suitably manipulating the valve stem *w*. For convenience, the conduit T which receives the overflow wash water from the trough K and which conveys it to the sewer, may be placed in the channel D.

Having thus described my invention, what I claim is:

1. The method of preventing the ingress of sand from a filter bed operating by suction due to negative head, into a system of air-pipes employed for opening up or loosening the filtering material during the operation of washing the filter bed, which consists in filling the air supply pipes with water before the interruption of the filtration flow; substantially as described.

2. The method of cleaning a filter bed, which consists in washing the same by a reverse flow of water assisted by currents of air; discontinuing the admission of air; driving the air out of the air-supply conduits by supplying its place therein by water; and permitting the air to escape with the wash-water before reëstablishing the filtration flow; substantially as described.

In testimony whereof I affix my signature, in presence of two witnesses.

WILLIAM A. STEVENSON.

Witnesses:
K. R. POWERS,
F. H. BOYNTON.

---

Copies of this patent may be obtained for five cents each, by addressing the "Commissioner of Patents, Washington, D. C."